United States Patent

Kamiyama et al.

[15] 3,645,808

[45] Feb. 29, 1972

[54] METHOD FOR FABRICATING A SEMICONDUCTOR-INTEGRATED CIRCUIT

[72] Inventors: Takamitsu Kamiyama, Kokubunji-shi; Michiyoshi Maki, Kodaira-shi, both of Japan

[73] Assignee: Hitachi, Ltd., Tokyo, Japan

[22] Filed: Apr. 24, 1968

[21] Appl. No.: 747,361

[30] Foreign Application Priority Data

July 31, 1967 Japan....................................42/48796

[52] U.S. Cl...........................148/187, 148/188, 317/235 D, 317/235 AQ

[51] Int. Cl...........................................................H01l 7/34

[58] Field of Search..................................148/186, 187, 188

[56] References Cited

UNITED STATES PATENTS

| | | | |
|---|---|---|---|
| 3,423,647 | 1/1969 | Kurosawa et al. | 148/187 |
| 3,440,113 | 4/1969 | Wolley | 148/190 |
| 3,486,950 | 12/1969 | Lesk | 148/187 |

*Primary Examiner*—L. Dewayne Rutledge
*Assistant Examiner*—J. Davis
*Attorney*—Craig, Antonelli & Hill

[57] ABSTRACT

A method for selectively diffusing gold into a silicon substrate, wherein a plurality of circuit elements spaced from each other are formed on a surface portion of the substrate and a gold layer, not covering the PN-junction exposed at the surface thereof, is deposited on the surface of a specific circuit element which is desired to have a high-switching speed and then said gold is subjected to thermal treatment so that said deposited gold may be diffused into said specific circuit element.

8 Claims, 16 Drawing Figures

INVENTORS
TAKAMITSUI KAMIYAMA
MICHIYOSHI MAKI
BY Craig & Antonelli
ATTORNEYS

INVENTORS
TAKAMITSUI KAMIYAMA
MICHIYOSHI MAKI

BY Craig & Antonelli

ATTORNEYS

INVENTORS
TAKAMITSUI KAMIYAMA
MICHIYOSHI MAKI
BY Craig & Antonelli
ATTORNEYS

INVENTORS
TAKAMITSUI KAMIYAMA
MICHIYOSHI MAKI
BY Craig & Antonelli
ATTORNEYS

INVENTORS
TAKAMITSUI KAMIYAMA
MICHIYOSHI MAKI
BY Craig & Antonelli
ATTORNEYS

INVENTORS
TAKAMITSUI KAMIYAMA
MICHIYOSHI MAKI
BY Craig & Antonelli
ATTORNEYS

METHOD FOR FABRICATING A SEMICONDUCTOR-INTEGRATED CIRCUIT

BACKGROUND OF THE INVENTION

1. Field of the Invention

This invention relates to a method for fabricating a semiconductor-integrated circuit and more particularly to a method for diffusing gold into a specific circuit element to give said circuit element a high switching speed without altering the electrical characteristics of the other elements.

2. Description of the Prior Art

There is publicly known a method for diffusing gold which works as lifetime killer for excess minority carriers into a substrate of a semiconductor integrated circuit, such as a silicon monocrystal substrate when a circuit element of a semiconductor integrated circuit is to be made into a high speed switching element.

Gold is diffused by depositing gold on the back surface of a silicon substrate and subjecting said gold to thermal treatment for a predetermined time at a predetermined temperature. Gold is diffused from the back surface for the following reason. When gold is deposited on a silicon substrate surface, i.e., a surface on which a circuit element such as a transistor, a diode, etc., is formed, Au-Si alloy is formed on the substrate surface during the thermal treatment for gold diffusion because gold and silicon form an eutectic alloy at a relatively low temperature. When the PN-junction of a circuit element is quite thin, the PN-junction is likely to be damaged by said alloy. Thus, gold diffusion from the backside is much safer. Moreover, since the diffusion speed of gold is much faster than that of donors and acceptors, gold is diffused uniformly into the semiconductor without causing the rediffusion of the donors and acceptors already diffused even if gold is diffused from the back surface.

However, according to this prior art method, even when a circuit element, wherein a longer lifetime of excess minority carriers is preferable, exists among circuit elements composing an integrated circuit (e.g., transistors, diodes, resistors, etc.), gold is diffused into the region composing such elements and thus it becomes quite difficult to make an integrated circuit having the desired characteristics.

For example, in a low-level logic circuit, it is required that the gate diodes and inverter transistors have a short storage time and that level shift diodes have a long storage time. When said circuits are incorporated into one integrated circuit and gold is deposited on the back surface of the integrated circuit (the surface where the circuit elements are not formed) and diffused therefrom uniformly to achieve said requirements, gold distributes uniformly in the gate diodes, inverter transistors, level shift diodes, etc. Thus, the storage time of all the circuit elements becomes short and the aim of obtaining a level shift diode having a long storage time cannot be achieved. In addition, the behavior of gold diffusion into a silicon substrate is structure-sensitive to the characteristics of the substrate crystals and has a poor reproducibility. This causes obstacles against fabricating precision integrated circuits.

According to the development of integrated circuits, there arises the requirement for making a circuit element having a short storage time or a high switching speed and at the same time in a single integrated circuit substrate a circuit element having a long storage time.

As a method to fulfill said requirement, a method for selectively diffusing gold from the back surface of a semiconductor circuit substrate using a $SiO_2$ film as a diffusion mask has been proposed. (Japanese Pat. Publication No. 9704/66). According to said method, gold can be diffused selectively into a desired part of the elements of the integrated circuit, but since the $SiO_2$ film on the back surface opposing the high-speed-switching circuit placed on the substrate for the integrated circuit is etched away by a photoetching method, technical difficulties arise in arranging photoresist masks and moreover since the method of gold diffusion is essentially the same as the conventional method, a diffusion temperature and a period of time is sufficient for gold to reach from the backside of the integrated circuit to the top surface. Accordingly, it is difficult to form gold-diffused regions on a limited surface portion of an integrated circuit substrate by this method. Quite a large error will necessarily appear and in view of said error, a circuit element with a long storage time should be placed at a rather long distance away from a circuit element having a short storage time. This prevents a high density in regard to the structure of an integrated circuit.

SUMMARY OF THE INVENTION

A primary object of this invention is to provide a method for fabricating an improved semiconductor-integrated circuit wherein only specific circuits include gold.

Another object of this invention is to provide a method for fabricating an improved semiconductor-integrated circuit wherein a part of the circuit elements of the semiconductor-integrated circuit is turned into an element having a high switching speed.

A further object of this invention is to provide a novel method for selectively diffusing gold into a substrate of a semiconductor-integrated circuit.

The gist of the present invention resides in that a circuit element having high switching speed is provided by diffusing gold into a specific circuit element region according to thermal treatment for a predetermined time after depositing gold on the surface or in the vicinity of the surface of such a specific circuit element among the circuit elements on a semiconductor-integrated circuit element that is to have a high switching speed. Especially when the diffusion of gold is to be limited to a narrow region, said specific circuit is surrounded in advance with a material having the effect of suppressing gold diffusion and then gold is diffused into the circuit element region by said method. Thereby, gold is diffused into a limited region only.

BRIEF DESCRIPTION OF THE DRAWINGS

FIG. 2 is a top view and FIG. 3 shows a cross section along the line A—A'.

FIG. 7 shows a case where the diffusion temperature is 1,000° C. and FIG. 8 shows a case where the diffusion temperature is 1,100° C.

DESCRIPTION OF THE PREFERRED EMBODIMENTS

Figure 1:
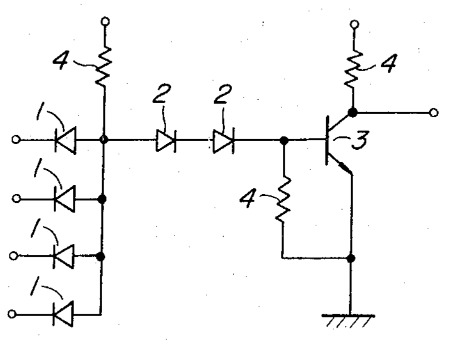
FIG. 1 shows a known low-level logic circuit.

As material having the effect of suppressing gold diffusion, the present inventors discovered phosphorus and antimony.

When an integrated circuit substrate is made of silicon, eutectic alloy with deposited gold is formed at 370° C. Accordingly, when the amount of gold deposition is large, much Si-Au alloy is formed and a PN-junction of a circuit element may be damaged. However, when the amount of gold deposition is smaller than in the order of millimicro gram per square centimeter, a PN-junction deeper than 1 $\mu$ is not damaged by the Si-Au alloy. In this invention, it has experimentally been found that an amount of gold deposition of the order of micromicro gram per square centimeter to millimicro gram per square centimeter is preferable. The amount of gold diffusion in a semiconductor is a function of the solid solubility between the semiconductor and gold, the diffusion temperature and the diffusion time. In order to prevent the rediffusion of the donors and acceptors previously diffused into the semiconductor to form a circuit element, a shorter diffusion time and a lower diffusion temperature are desirable. According to experiments conducted by the present inventors, it has been found that a good result is obtained with a diffusion time of less than 10 minutes when the diffusion temperature is 900°–1,100° C.

Further, the effect of phosphorus and antimony to prevent gold diffusion is weak unless the concentration thereof in the diffused region is more than $10^{19}$ atoms per cubic centimeter.

According to the conventional method wherein gold is diffused into a silicon substrate after gold is deposited all over the back surface of the silicon substrate, gold is diffused even into an element whose storage time is to be short and the storage time of all the elements is made short and thus it is difficult to increase the operational speed of an integrated circuit. On the other hand, according to the method of this invention, gold can be diffused into only those circuits whose storage time is to be short and thus a high-speed integrated circuit can be provided. Further, according to the method for selectively diffusing gold from the back surface of a silicon substrate by using a $SiO_2$ film as a mask, technical difficulties arise in arranging photoresist masks and further it is difficult to impose the influence of gold only on a predetermined circuit element on a semiconductor surface because the diffusion speed of gold is very fast and difficult to control. However, according to the method of this invention, the photoresist technique used in a conventional planar technique can be employed and adjustment of masks for selective diffusion can be made easily and accurately. Therefore, the range of gold diffusion can be controlled quite accurately by the temperature and the time of thermal treatment and the amount of gold deposition. When the range on which gold imposes its effect is to be limited particularly to a specific area, a better effect is obtained by using a material preventing gold diffusion like phosphorus, antimony, etc. It is to be noted that PN-junctions should not be covered with deposited gold. Since the deposited gold is quite thin in this invention, no problems occur even when the electrode metal such as aluminum is deposited on the gold layer.

Referring to the figures, FIG. 1 shows a conventional low-level logic circuit, wherein 1 designates gate diodes, 2 designates level shift diodes, 3 indicates an inverter transistor and 4 indicates load resistors. It is desirable that the gate diodes 1 and the inverter transistors 3 have a high switching speed and the level shift diodes 2 have a low switching speed. The integration of such circuits has been difficult by conventional methods, but can be realized by the method of this invention. The manufacturing process thereof is explained with reference to FIGS. 9 to 14.

Figure 2:
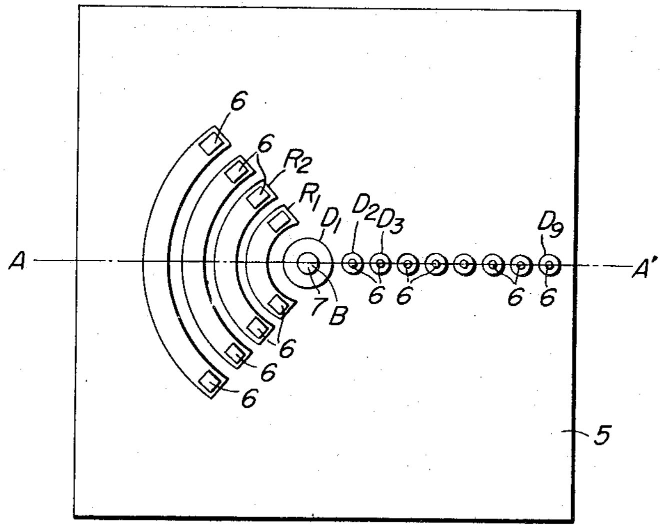
FIGS. 2 and 3 show a sample wherein rows of resistance elements and diode elements are formed on a surface of a semiconductor substrate to study the effect of gold diffusion.
Figure 3:
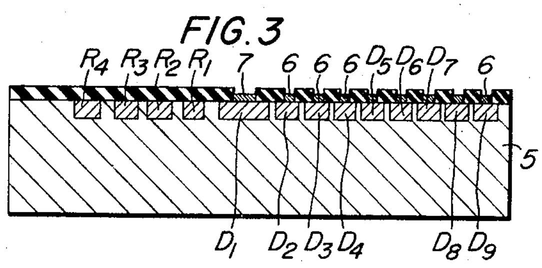

FIGS. 2 and 3 show the result of an experiment to test the range from the source of gold diffusion to which the effect of gold reaches when gold is diffused into a semiconductor substrate according to the method of this invention, wherein FIG. 2 shows the upper surface of the semiconductor substrate and FIG. 3 shows a cross section along the line A—A′ of FIG. 2. Rows of diode elements $D_1$, $D_2$, $D_3$ ..... $D_9$ and rows of resistance elements $R_1$, $R_2$, $R_3$, $R_4$ are formed by diffusing boron into the surface of an N-type silicon substrate 5 having a specific resistance of 0.6 Ωcm. while using a $SiO_2$ film as mask. Then, a predetermined electrode metal like aluminum 6 is deposited on each circuit element. However, gold 7 is deposited on the surface of the diode element $D_1$ formed substantially at the center of the substrate. The amount of gold diffusion is generally a function of the deposition area, the thickness of the evaporated film and the diffusion temperature and time.

Figure 4:
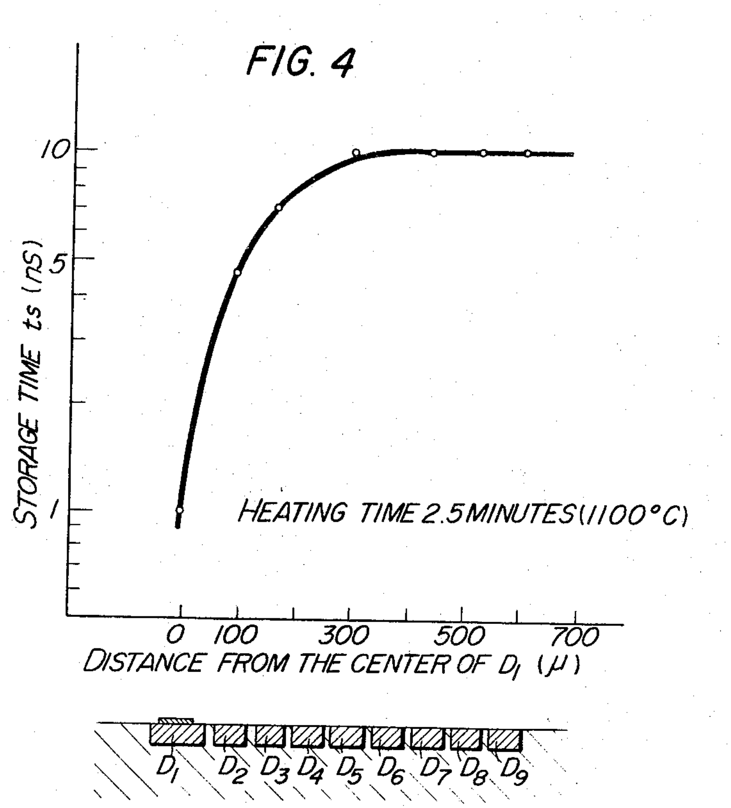
FIG. 4 shows the result of the variation of storage time of a diode element due to gold diffusion.
Figure 5:
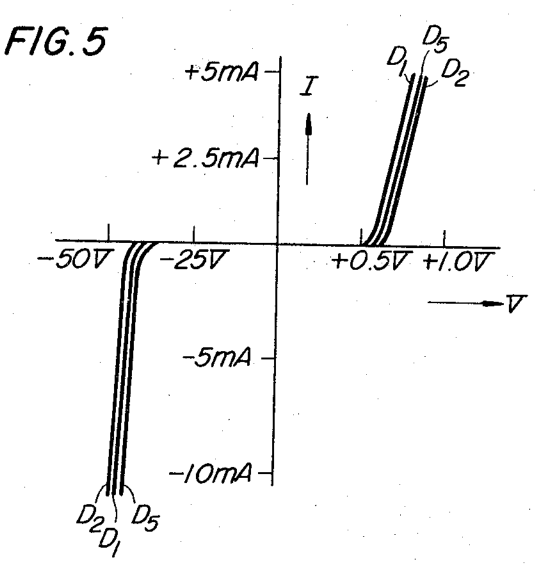
FIG. 5 shows V–I characteristics of a diode into which gold is diffused and a diode into which gold is not diffused, said characteristics being obtained by selectively diffusing gold into the sample shown in FIGS. 2 and 3.

When the characteristics of the diode elements $D_1$, $D_2$, ...... $D_9$ and the resistance elements $R_1$, $R_2$, $R_3$, $R_4$ are studied by subjecting a silicon sample to thermal treatment at 1,100° C. for 2.5 minutes in a furnace after the evaporation of gold, the results shown in FIGS. 4 and 5 are obtained as to the diode elements and as to the resistance elements the results shown in the following Table are obtained.

TABLE 1

| Number of sample | Condition of gold diffusion: Diffusion temperature, ° C. | Condition of gold diffusion: Diffusion time, min. | $\frac{Ri}{\bar{R}}$: $R_1$, *100μ | $\frac{Ri}{\bar{R}}$: $R_2$, *200μ | $\frac{Ri}{\bar{R}}$: $R_3$, *300μ | $\frac{Ri}{\bar{R}}$: $R_4$, *400μ | $\bar{R}$, (Without gold diffusion), Ω |
|---|---|---|---|---|---|---|---|
| S1R | 1,000 | 2.5 | 0.98 | 1.01 | 1.01 | 1.01 | 161 |
| S2R | 1,000 | 4.5 | 1.05 | 1.02 | 1.02 | 1.02 | 154 |
| S3R | 1,000 | 7.5 | 1.00 | 1.00 | 1.02 | 1.02 | 170 |
| S4R | 1,000 | 12.5 | 0.96 | 0.97 | 0.89 | 0.96 | 177 |
| S5R | 1,100 | 2.5 | 0.99 | 1.01 | 1.01 | 0.99 | 169 |
| S6R | 1,100 | 4.5 | 0.98 | 1.01 | 1.01 | 0.98 | 171 |
| S7R | 1,100 | 7.5 | 1.06 | 1.05 | 1.02 | 1.04 | 167 |
| S8R | 1,100 | 12.5 | 0.98 | 0.98 | 0.99 | 0.99 | 170 |

Ri=resistance value when gold is diffused.
$\bar{R}$=resistance value per unit length when gold is not diffused.
*Distance between the center of $D_1$ and the center of the resistance element.

As is evident from the Table, the resistance value is scarcely influenced by gold diffusion. Accordingly, only the effect of gold on the diode element will be described.

As is evident from FIG. 4, gold imposes its effect on the diode element over the range extending about 300 $\mu$ (surface part) from the source of gold diffusion under said diffusion conditions. Namely, the same figure shows the difference in storage time of the diodes when gold is diffused and when gold is not diffused, and the diodes within 300 $\mu$ apart from the source of gold diffusion have a shorter storage time ranging from 10 ns ec. which is the storage time of the diode not diffused with gold to 1 ns ec. proportionate to the concentration of gold on account of the influence of gold.

FIG. 5 shows the results of measurements in regard to the V–I characteristics of diodes diffused with gold and not diffused with gold. The results show no marked difference between the two. In other words, no effect of gold diffusion is apparent. It is understood from these experimental results that the storage time of diodes can be made shorter without altering the V–I characteristics thereof.

Figure 6:
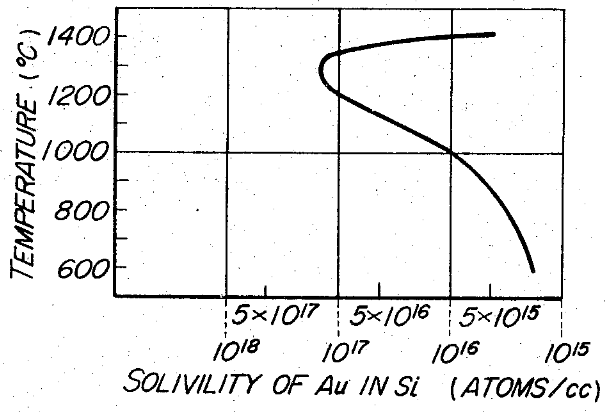
FIG. 6 shows a solid solubility curve of gold in a silicon crystal.
Figure 7:
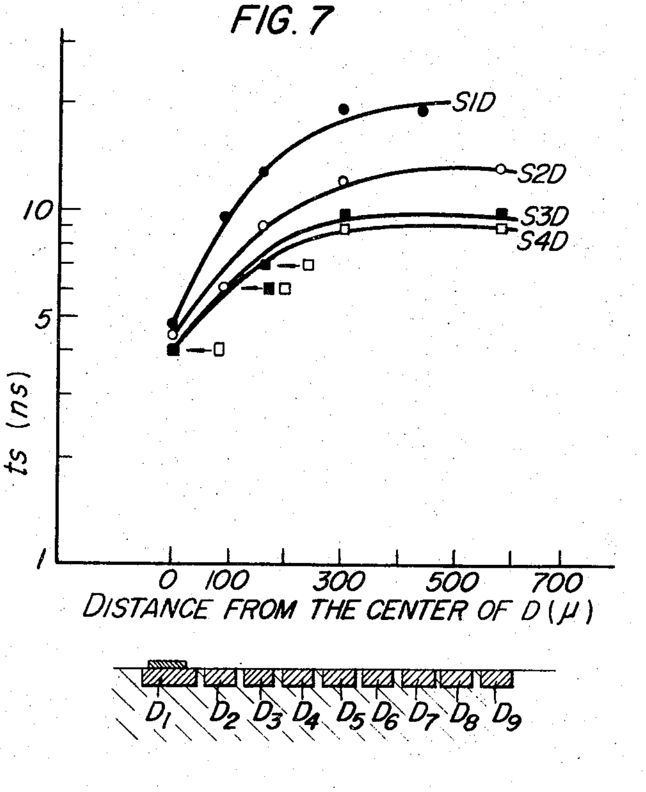
FIGS. 7 and 8 show the result of measurements in regard to the effect of gold diffusion at a constant diffusion temperature on each diode element for each diffusion time.
Figure 8:
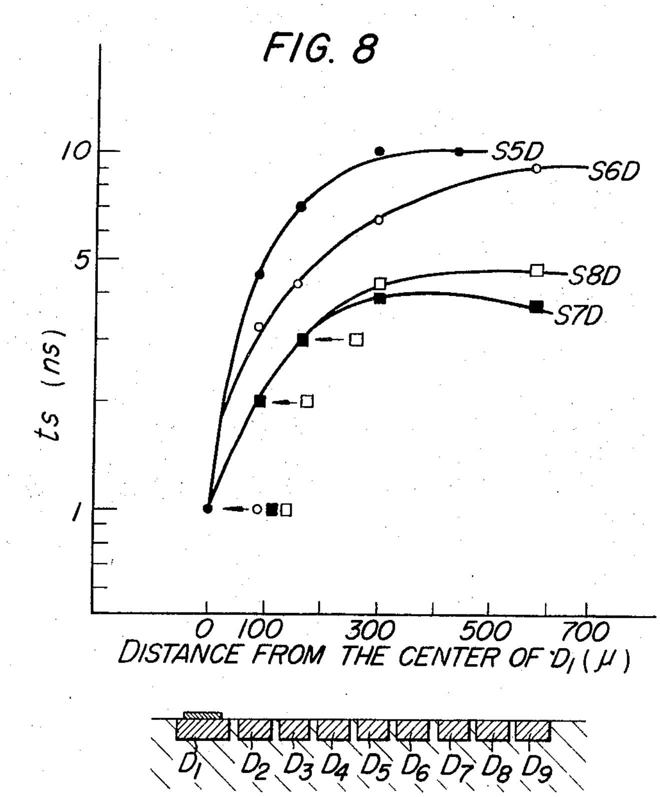

The diffusion of gold in a semiconductor is a function of the relation between the solid solubility of gold with the semiconductor and the heating temperature and the heating time. Hence, by suitably selecting the values thereof, gold diffusion or the range over which gold imposes its effect on the electrical characteristics of a semiconductor circuit element can be controlled arbitrarily FIG. 6 shows a solid solubility curve of gold in silicon. FIGS. 7 and 8 show the result of an experiment to see how the storage time of the rows of diodes shown in FIG. 2 changes with the heating time when the heating temperature is 1,000° C. (FIG. 7) and 1,100° C. (FIG. 8). In the figure, the minimum heating time is 2.5 minutes, but this value is only a limit of the heater device used in this experiment. If electron beam heating, laser beam heating or the like is used, the heating time can be reduced further. In searching for the desired storage time, the heating temperature can be uniquely determined from the relation with the solid solubility curve shown in FIG. 6. For example, when the storage time of the diode $D_1$ is to be made 1 ns ec., it is seen from FIGS. 6 to 8 that the heating temperature should be over 1,100° C. Namely, in order to obtain a storage time of 1 ns ec., $D_1$ should include gold of the order of about $3\times10^{16}$ atoms per cubic centimeter, but when the heating temperature is 1,000° C., the amount of gold which can diffuse into a silicon crystal is about $10^{16}$ atoms per cubic centimeter and smaller by a factor of one-third compared with the case of 1,100° C. as a result, the storage time of the diode D becomes about 4 ns ec. and long as shown in FIG. 7. In the present experiment, a pickup crystal having a specific resistance of 0.6 Ωcm. is used as the silicon substrate crystal. When the storage time of $D_1$ is to be further reduced to 1 ns ec. or shorter than 4 ns ec., it is known that such reduction can be achieved by using an epitaxial crystal of $N^-$ on an $N^+$ substrate or $P^-$ on a $P^+$ substrate. If the heating time is further lengthened, gold diffuses further and shortens the storage time of the adjacent diodes $D_2$, $D_3$ ..... one by one, but in case of a short time diffusion, since the distribution of gold due to diffusion is Gaussian, the same amount of gold as diffuses into $D_1$ does not enter $D_2$, $D_3$ and the storage time of the latter does not become as short as that of $D_1$. Therefore, if the storage time of $D_2$, $D_3$ is to be made 1 ns ec. as with $D_1$, gold should be deposited on the surface parts of $D_2$, $D_3$ as in $D_1$ and thermal treatment should be performed for a short time. As is evident from the above experimental result, it seems that the effect of gold appears in the range within 300 $\mu$ from the source of gold diffusion according to the method of this invention, even if the diffusion time is shortened. Therefore, when installing a large number of circuit elements into a semiconductor substrate as in a semiconductor integrated circuit, passive circuit elements like resistance elements, capacitive elements, etc., which are not influenced by the presence of gold should be disposed in the vicinity of active elements like transistors, diodes, etc., whose minority carrier storage time is reduced by the method of this invention and circuit elements whose storage time should be long must be placed at a position separated from said active circuit elements by more than 300 microns.

Figure 9:
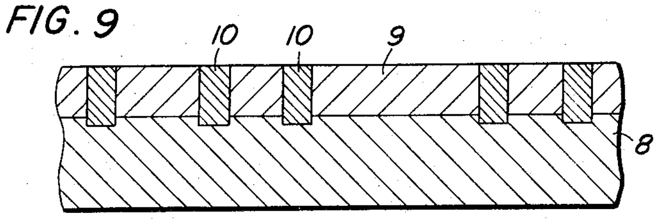
FIGS. 9 to 11 show longitudinal sectional diagrams of an embodiment of this invention formed by integrating the low-level logic circuit shown in FIG. 1.
Figure 10:
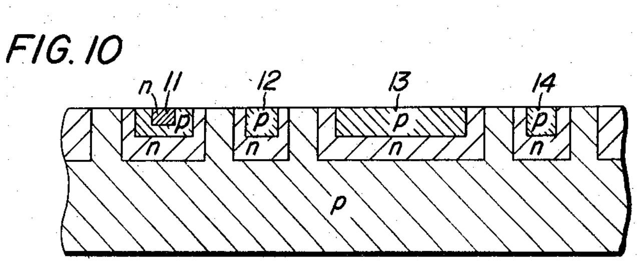
Figure 11:
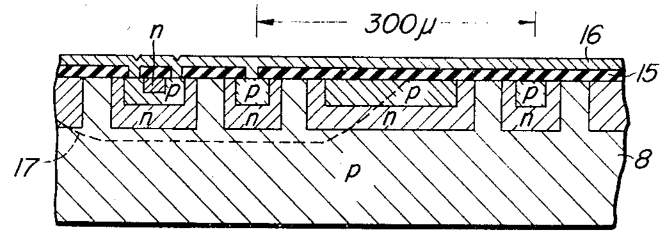

Based on said experimental results, the manufacturing processes shown in FIGS. 9 to 11 are needed to make the low level logic circuit shown in FIG. 1 according to this invention.

As shown in FIG. 9, an N-type silicon monocrystal layer 9 is formed on a P-type silicon substrate 8 by the epitaxial growth method and boron is selectively diffused into the predetermined parts 10 of said epitaxial layer 9 by using the mask effect of the $SiO_2$ film. Said diffused layers 10 penetrate through the epitaxial layer 9 and separate the epitaxial layer 9 from the PN-junctions.

Then, an NPN-transistor (inverter transistor) 11, a diode (gate diode) 12, a diffused resistor 13, a diode (level shift diode) 14 are formed on the respective regions of the N-type epitaxial layer insulated from each other by the PN-junctions as shown in FIG. 9 by the use of known techniques for making a planar-type transistor. (FIG. 10)

The donor impurity used here is phosphorus and the acceptor impurity is boron. The surface of said silicon substrate comprising the transistor, the diodes and the resistor is covered with $SiO_2$ film 15. Then, after eliminating the $SiO_2$ film 15 on the base region of the NPN-transistor (inverter transistor) 11 and on the boron-diffused region of the gate diode 12, gold indicated by 16 in FIG. 11 is deposited all over the surface of the silicon substrate. Said gold contacts the semiconductor only at the base region of the transistor and at the boron diffused region of the gate transistor and said gold is separated from the semiconductor by the $SiO_2$ film at the other parts. Then, the silicon substrate 8 is heated at a temperature of 1,000°–1,100° C. for a period of time as short as possible, e.g., 2.5 minutes, to diffuse gold into the semiconductor substrate. The diffusion of gold occurs in this case at the parts where gold contacts the semiconductor. The gold on the $SiO_2$ film does not react with the $SiO_2$ film at a temperature of about 1,100° C. and scarcely diffuses into the $SiO_2$ film. Since gold diffuses in a semiconductor substrate more in a surface direction than in an inward direction, the gold in the substrate diffuses as shown by the dotted line 17 in FIG. 11. Since the region surrounded by said dotted line 17 includes gold, the electrical characteristics of the circuit elements are altered and more in particular the minority carrier storage time is reduced. However, since the resistance elements are hardly influenced by gold as is evident from Table 1, the electrical characteristics of the resistance elements remain unchanged. Since it is preferable that the storage time of the level shift diode 14 is longer, the level shift diode should be separated from the source of gold diffusion (the gate diode in this case) by about 300 microns. Thereby, the influence of gold on the level shift diode is prevented.

If the gold on the $SiO_2$ film is etched away after the gold diffusion, those parts of the $SiO_2$ film placed on the substrate surface, where the ohmic contact is derived from the transistor, the diodes and the resistor, are eliminated and further if aluminum is deposited by the vacuum evaporation method all over the surface of the substrate while keeping the temperature of the substrate at about 500° C., ohmic contact appears at the part where the $SiO_2$ film is etched away, and the $SiO_2$ film contacts closely the evaporated aluminum film. Then, when the unnecessary part of the aluminum is etched away, the gate diode, the level shift diode, the inverter transistor and the resistance element insulated from each other by the PN-junctions become electrically connected with the aluminum on the substrate surface and an integrated circuit having the same function as that of the circuit shown in FIG. 1 is completed. In such an integrated circuit, the gate diode and the inverter transistor have a short storage time while the storage time of the level shift diode is long. Thus, the desired object is achieved.

In the embodiment described above, when there exists a circuit element to which gold is to be added, such circuit elements as those which abhor the influence of gold cannot be placed at a position within 300 microns from said circuit element and only circuit elements not influenced by the presence of gold can be placed around such circuits. This fact sets a limit to the design of an arrangement of circuit elements in an integrated circuit and cannot be neglected in the design of a particularly small integrated circuit.

Accordingly, in order to realize an extremely small integrated circuit, there is required the development of a technique to diffuse gold into a narrow region in the vicinity of a predetermined circuit element. This invention also proposes such a technique of selective diffusion of gold which solves said requirements.

According to the experiment on the various states of gold diffusion by the present inventors, semiconductor surface layer diffusion of gold is much faster than diffusion into a semiconductor body as has been described hereinabove. Since all the circuits composing an integrated circuit are formed on a semiconductor surface layer, they are likely to be influenced by gold diffusion. Thus, the present inventors have developed a technique according to which a material preventing gold diffusion is provided on the surface of a semiconductor substrate in a way to surround the source of gold diffusion to limit the semiconductor surface layer diffusion to a predetermined region and to reduce the effect of gold diffusion on the other circuit elements as much as possible.

As a material preventing gold diffusion, phosphorus, antimony, etc., are known at present by the present inventors, but other materials having the same effect will be found in the future.

Here below an embodiment will be explained where the circuits are integrated as shown in FIG. 1.

Figure 12:
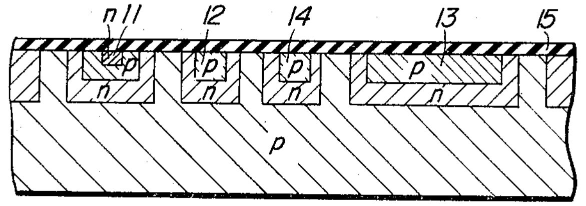
FIGS. 12 to 14 show longitudinal sectional diagrams of another embodiment of this invention formed by integrating the low-level logic circuit shown in FIG. 1.
Figure 13:
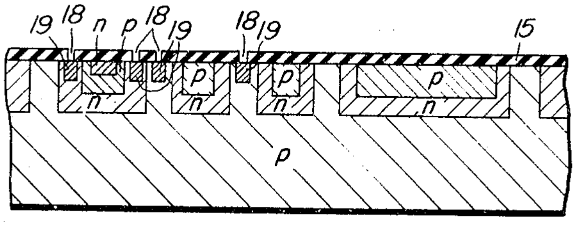
Figure 14:
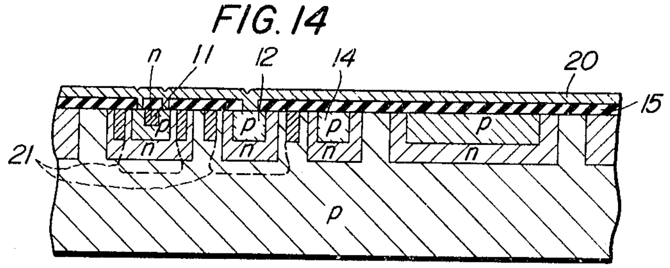

Referring to FIGS. 12 to 14, FIG. 12 shows a cross section of an integrated circuit fabricated according to the same method as is applied to making the integrated circuit shown in FIG. 10. In this figure as in FIG. 10, 11 designates an inverter transistor, 12 designates a gate diode, 13 designates a diffused resistor and 14 indicates a level shift diode. The difference from FIG. 10 lies in the positions of 12 and 13. Reference numeral 15 indicates the $SiO_2$ film.

In order to make the storage time of the transistor 11 and the gate diode 12 short by selectively diffusing gold only into said elements in accordance with the desired object of said circuit (low-level logic circuit), holes 18 (FIG. 13) are provided at the predetermined parts of the $SiO_2$ film 15 on the semiconductor substrate surface, phosphorus is diffused through said holes and layers 19 including a high concentration of phosphorus are formed. Then, $SiO_2$ is again deposited on the surface of the semiconductor substrate to cover the semiconductor surface completely and then after holes are provided on the $SiO_2$ film at the base region of the inverter transistor and at the P-type region of the gate diode, gold 20 (FIG. 14) is deposited on the $SiO_2$ film and heated at a predetermined temperature and during a predetermined time (1,000°–1,100° C., 2–4 minutes). Thereby, gold diffuses into the semiconductor. In this case, gold diffuses into a semiconductor substrate over a distance determined by the time and the temperature, but the diffusion along the semiconductor surface layer is stopped by the layer 19 having a high concentration of phosphorus provided on the substrate surface by diffusion. Accordingly, the diffusion of gold is limited to the vicinity of the inverter transistor 11 and the gate diode 12 as shown by a dotted line 21 and even if the level shift diode 14 whose storage time should be long is placed adjacently to the gate diode 12, the level shift diode 14 is not influenced by gold. Then, the $SiO_2$ film at the electrode parts of the respective elements are etched away, aluminum is deposited all over the surface of the silicon substrate, the metal layers except the predetermined aluminum layers and the gold layer thereunder are etched away by photoetching technique and the circuit elements formed on the surface of the semiconductor substrate are wired by evaporation to form an integrated circuit.

According to the method of this embodiment, the arrangement of constituent circuit elements of an integrated circuit has a rather large degree of freedom and even in an integrated circuit wherein part of the circuit elements includes gold, miniaturization or realization of a dense structure is possible.

Figure 15A:
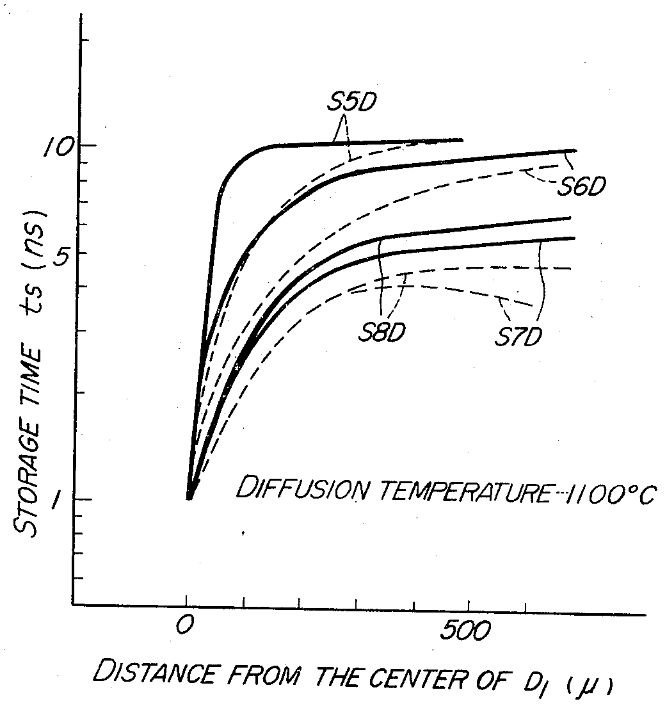
FIG. 15 shows the result of measurements in regard to the effect of a high concentration phosphorus layer to prevent gold diffusion.
Figure 15B:
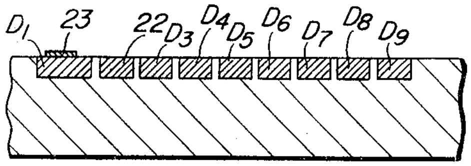

FIG. 15*a* shows the result of measurements in regard to the effect of phosphorus to prevent gold diffusion. The result is obtained by evaporating gold 23 on the surface of the sample diode $D_1$ shown in FIG. 2 after forming a phosphorus diffused layer 22 shown in FIG. 15*b* having an impurity concentration of about $10^{20}$ atoms per cubic centimeter around the diode $D_1$, subjecting said samples to thermal treatment at 1,100° C. for 2.5 minutes, 4.5 minutes, 7.5 minutes and 12.5 minutes and measuring the storage time of each diode. For comparison, the result of measurements on the sample which is not subjected to phosphorus treatment but subjected to thermal treatment under the same conditions (FIG. 8) is added in FIG. 15 by dotted lines. The difference is evident. In a sample not subjected to phosphorus treatment, the effect of gold appears more or less in all the diodes and the effect is more remarkable in the diodes up to $D_4$, $D_5$, but when the phosphorus treatment is performed, the effect of gold does not appear in the diodes $D_3$–$D_9$ in the case of the thermal treatment for 2.5 minutes and these diodes show a minority carrier storage time of about 10 ns ec. obtained with diodes to which gold is not added. Thus, it is understood that the phosphorus layer prevents the surface diffusion of gold. However, when the time of thermal treatment becomes long, gold penetrates through the phosphorus layer and influences the storage time of each diode, but the amount of gold penetrating through the phosphorus layer is small and thus the influence on the storage time is small.

Though this invention has been described hereinabove with particular reference to some embodiments of the invention, it is to be noted that this invention is not limited to the embodiments described hereinabove, but various changes and modifications can be made without departing from the spirit of this invention.

What is claimed is:

1. A method for fabricating an integrated circuit including a plurality of circuit elements at least one of said circuit elements being of high switching speed comprising the steps of: preparing a semiconductor substrate in which a plurality of circuit elements are formed at one surface portion of the substrate by solid diffusion of impurity; forming a diffusion region of a material preventing gold diffusion into the substrate laterally around the circuit element to be of a high switching speed; depositing a gold layer on the surface of the circuit element to be of high switching speed by vacuum evaporation; subjecting the semiconductor substrate to a thermal treatment so that the deposited gold may be diffused only into the surface portion surrounded by the gold diffusion preventing material.

2. A method according to claim 6 in which the material preventing gold diffusion is one selected from a group consisting of phosphorus and antimony.

3. A method according to claim 1 in which the material of the diffusion region contains more than $10^{19}$ atoms per cubic centimeter of the material preventing gold diffusion.

4. A method according to claim 1 in which the semiconductor substrate is silicon and the circuit element is a transistor or a diode.

5. A method according to claim 1 in which said thermal treatment is carried out for a period of time in the range of 1 minute to 10 minutes and at a temperature in the range from 900° centigrade to 1,100° centigrade.

6. A method according to claim 5 in which the thermal treatment is performed for 2.5 minutes.

7. A method according to claim 6, wherein the thermal treatment is performed at a temperature of from about 1,000° to 1,100° C.

8. A method according to claim 1, in which the material preventing gold diffusion is phosphorus or antimony and has a concentration of more than $10^{19}$ atoms per cubic centimeter in said diffusion region and said thermal treatment is performed for 1 minute to 10 minutes at a temperature of from 900° to 1,100° C.

* * * * *

UNITED STATES PATENT OFFICE
CERTIFICATE OF CORRECTION

Patent No. 3,645,808 Dated February 29, 1972

Inventor(s) Takamitsu Kamiyama and Michiyoshi Maki

It is certified that error appears in the above-identified patent and that said Letters Patent are hereby corrected as shown below:

Title Page, Left Column, Line 8

"Filed: Apr. 24, 1968" should read

--Filed: July 24, 1968--

Signed and sealed this 5th day of September 1972.

(SEAL)
Attest:

EDWARD M.FLETCHER, JR.
Attesting Officer

ROBERT GOTTSCHALK
Commissioner of Patents